US011218647B2

(12) United States Patent
Shibuno et al.

(10) Patent No.: US 11,218,647 B2
(45) Date of Patent: Jan. 4, 2022

(54) IMAGING APPARATUS WITH CORRECTION FACTOR SCALING OF IMAGE

(71) Applicant: Panasonic Intellectual Property Management Co., Ltd., Osaka (JP)

(72) Inventors: Koji Shibuno, Osaka (JP); Masahiro Murakami, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/008,841

(22) Filed: Sep. 1, 2020

(65) Prior Publication Data

US 2021/0075976 A1 Mar. 11, 2021

(30) Foreign Application Priority Data

Sep. 5, 2019 (JP) .............................. JP2019-161994

(51) Int. Cl.
*H04N 5/262* (2006.01)
*H04N 5/232* (2006.01)

(52) U.S. Cl.
CPC ....... *H04N 5/2628* (2013.01); *H04N 5/23212* (2013.01); *H04N 5/23229* (2013.01); *H04N 5/23296* (2013.01); *H04N 5/23258* (2013.01); *H04N 5/23287* (2013.01)

(58) Field of Classification Search
CPC ............. H04N 5/2628; H04N 5/23212; H04N 5/23296; H04N 5/23229; H04N 5/23258; H04N 5/23287; H04N 5/232123; H04N 5/23209; H04N 5/23264–23274
See application file for complete search history.

(56) References Cited

U.S. PATENT DOCUMENTS

| 2006/0126081 | A1 | 6/2006 | Watanabe | |
| 2014/0210972 | A1* | 7/2014 | On | A61B 1/00188 348/65 |
| 2014/0300799 | A1* | 10/2014 | Yoshino | H04N 5/23296 348/347 |
| 2015/0015728 | A1* | 1/2015 | Miyazawa | H04N 5/23296 348/208.4 |

(Continued)

FOREIGN PATENT DOCUMENTS

| JP | H11-136562 A | 5/1999 |
| JP | 2002-182302 A | 6/2002 |
| JP | 2006-129211 A | 5/2006 |

*Primary Examiner* — Albert H Cutler
(74) *Attorney, Agent, or Firm* — Renner, Otto, Boisselle & Sklar, LLP

(57) ABSTRACT

An imaging apparatus includes: an imager configured to capture a subject image formed via an optical system including a focus lens to generate image data; a focusing driver configured to adjust a focus lens position at which the focus lens is positioned along an optical axis in the optical system; and a controller configured to perform image processing for scaling an image indicated by the image data based on the focus lens position, wherein the focusing driver moves the focus lens position back and forth in predetermined wobbling period, and wherein the controller controls a correction factor to follow a change in which the focus lens position swings in a period longer than the wobbling period, the correction factor defining the scaling of the image in the image processing.

8 Claims, 13 Drawing Sheets

(56) References Cited

U.S. PATENT DOCUMENTS

2019/0149739 A1* 5/2019 Sugita .................... G02B 7/282
                                                        348/240.99
2019/0377166 A1* 12/2019 Komatsu ................ G03B 17/14

* cited by examiner

IMAGING APPARATUS WITH CORRECTION FACTOR SCALING OF IMAGE

BACKGROUND

1. Technical Field

The present disclosure relates an imaging apparatus that performs a focusing operation using, for example, wobbling control.

2. Related Art

H11-136562 A discloses an imaging apparatus that aims to maintain a constant magnification of a captured image during wobbling operation. In this imaging apparatus, even when the magnification of the optical image is changed by the focus adjustment unit during wobbling operation, a magnification control signal for canceling this magnification is output to the electronic zoom changing unit. Then, the scaled optical image returned to the previous magnification again by the electronic zoom changing unit. Thus, by controlling an output image to always have a certain size, the aim is achieved.

JP 2002-182302 A discloses an angle-of-view correction device of an imaging lens for correcting an angle-of-view variation associated with focus operation of the imaging lens by electronic zoom processing. When an optical zoom operation in the imaging lens is performed, the angle-of-view correction device makes the electronic zoom closer to a preset reference magnification in conjunction with the zoom operation. Thus, the purpose of preventing such discomfort that the capturing angle-of-view changes instantaneously is achieved causing the electronic zoom to move gradually closer to and return to the reference magnification during the optical zoom operation.

SUMMARY

The present disclosure provides an imaging apparatus that can efficiently reduce quality degradation in images due to fluctuations in image magnification during focusing operation.

An imaging apparatus according to an aspect of the present disclosure includes an imager, a focusing driver, and a controller. The imager captures a subject image formed via an optical system including a focus lens to generate image data. The focusing driver adjusts the focus lens position at which the focus lens is positioned along the optical axis in the optical system. Based on the focus lens position, the controller performs image processing for scaling the image indicated by the image data. The focusing driver moves the focus lens position back and forth in a predetermined wobbling period. The controller controls a correction factor to follow the change in which the focus lens position swings in a period longer than the wobbling period, the correction factor defining the scaling of the image in the image processing.

An imaging apparatus according to another aspect of the present disclosure includes an imager, a focusing driver, and a controller. The imager captures a subject image formed via an optical system including a focus lens to generate image data. The focusing driver adjusts the focus lens position at which the focus lens is positioned along the optical axis in the optical system. Based on the focus lens position, the controller performs image processing for scaling the image indicated by the image data. The controller changes a correction factor from a predetermined reference value according to the change in the focus lens position, the correction factor defining the scaling of the image in the image processing. As the change in the focus lens position is more biased toward one direction of the two directions along the optical axis, the controller causes magnitude by which the correction factor changes from the reference value to be smaller.

According to the imaging apparatus in the present disclosure, it is possible to efficiently reduce deterioration in image quality due to fluctuations in image magnification during the focusing operation.

DETAILED DESCRIPTION

Hereinafter, embodiments of the present disclosure will be described with reference to the drawings as appropriate. However, in the detailed description, unnecessary portions of the description related to the prior art and substantially the same configuration may be omitted. This is to simplify the description. In addition, the following description and the accompanying drawings are disclosed to enable those skilled in the art to fully understand the present disclosure, and are not intended to limit the subject matter of the claims.

First Embodiment

Hereinafter, the configuration and operation of a digital camera being an embodiment of an imaging apparatus according to the present disclosure will be described.

1. Configuration

Figure 1:
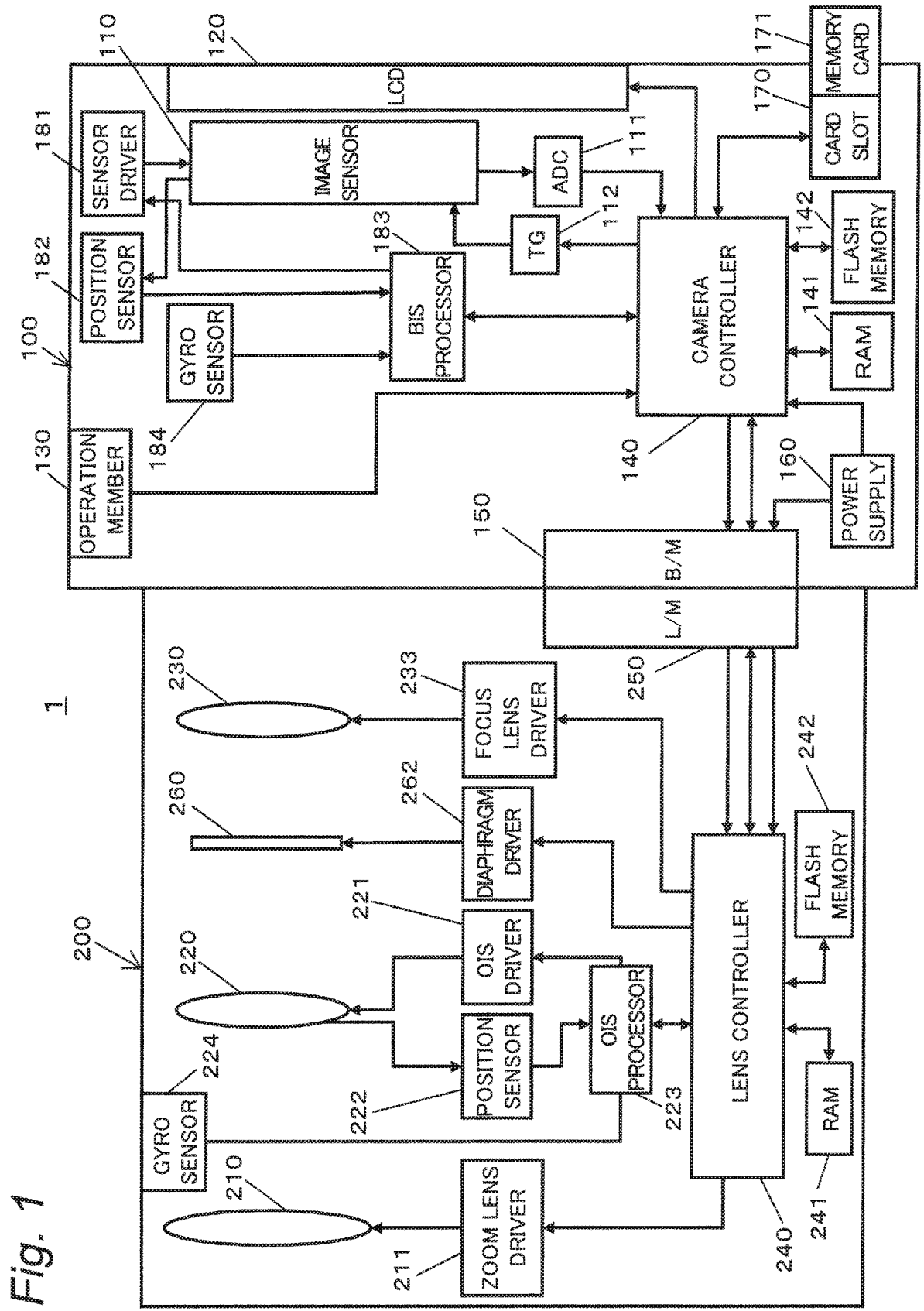
FIG. 1 is a block diagram illustrating a configuration of a digital camera according to a first embodiment of the present disclosure.

FIG. 1 is a block diagram showing the configuration of a digital camera 1 according to the first embodiment. The digital camera 1 of the present, embodiment includes a camera body 100 and an interchangeable lens 200 attachable thereto and detachable therefrom.

1-1. Camera Body

The camera body 100 (an example of an imaging apparatus) includes an image sensor 110, a liquid crystal monitor 120, an operation member 130, a camera controller 140, a body mount 150, a power supply 160, and a card slot 170.

The camera controller 140 controls the whole operation of the digital camera 1 by controlling components such as the image sensor 110 according to instructions from the operation member 130. The camera controller 140 transmits a vertical synchronization signal (VD) to the timing generator 112. In parallel with this, the camera controller 140 generates a synchronization signal synchronized with the vertical synchronization signal, and transmits the synchronization signal to the lens controller 240 via the body mount 150 and the lens mount 250. Hereinafter, the synchronization signal transmitted from the camera body 100 to the interchangeable lens 200 is referred to as a "BL synchronization signal". The camera controller 140 uses a RAM 141 as a work memory during control operations and image processing operations.

The image sensor 110 is a device that captures a subject image incident through the interchangeable lens 200 to generate image data. The image sensor 110 is a CMOS image sensor, for example. The generated image data is digitized by an AD converter 111. The digitized image data is subjected to predetermined image processing by the camera controller 140. The predetermined image processing includes, for example, gamma correction processing, white balance correction processing, defect correction processing, YC conversion processing, electronic zoom processing, and JPEG compression processing. The image sensor 110 may be a CCD image sensor, an NMOS image sensor, or the like.

The image sensor 110 operates at the timing controlled by the timing generator 112. The image sensor 110 generates a still image, a moving image, or a through image for recording. The through image is mainly a moving image, and is displayed on the liquid crystal monitor 120 in order for the user to determine composition for capturing a still image.

The liquid crystal monitor 120 displays an image such as a through image and various information such as a menu screen. Instead of the liquid crystal monitor, another type of display device, for example, an organic EL display device may be used.

The operation member 130 includes various operation members such as a release button for instructing start of capturing, a mode dial for setting a capturing mode, and a power switch.

A card slot 170 can mount a memory card 171, and controls the memory card 171 based on control from the camera controller 140. The digital camera 1 can store image data into the memory card 171 and can read image data from the memory card 171.

The power supply 160 is a circuit that supplies power to each element in the digital camera 1.

The body mount 150 is mechanically and electrically connectable with the lens mount 250 of the interchangeable lens 200. The body mount 150 can transmit and receive data to and from the interchangeable lens 200 via the lens mount 250. The body mount 150 transmits the exposure synchronization signal received from the camera controller 140 to the lens controller 240 via the lens mount 250. Also, other control signals received from the camera controller 140 are transmitted to the lens controller 240 via the lens mount 250. The body mount 150 transmits the signal received from the lens controller 240 to the camera controller 140 via the lens mount 250. The body mount 150 supplies the power from the power supply 160 to the whole interchangeable lens 200 via the lens mount 250. The body mount 150 is an example of an acquisition module that acquires various types of information from the interchangeable lens 200 in the camera body 100.

In addition, as a configuration to achieve the BIS function (function to correct a camera shake with the shift of the image sensor 110), the camera body 100 further includes a gyro sensor 184 (camera shake detector) for detecting the camera shake of the camera body 100, and a BIS processor 183 for controlling the image stabilization processing based on the detection result of the gyro sensor 184. Furthermore, the camera body 100 includes a sensor driver 181 that moves the image sensor 110, and a position sensor 182 that detects the position of the image sensor 110.

The sensor driver 181 can be implemented with a magnet and a flat coil, for example. The position sensor 182 is a sensor that detects the position of the image sensor 110 in a plane perpendicular to the optical axis of the optical system. The position sensor 182 can be implemented with a magnet and a Hall element, for example.

The BIS processor 183 controls the sensor driver 181 based on the signal from the gyro sensor 184 and the signal from the position sensor 182, to shift the image sensor 110 in a plane perpendicular to the optical axis so as to offset the camera shake of the camera body 100. The range in which the image sensor 110 can be driven by the sensor driver 181 is mechanically limited. The range in which the image sensor 110 can be mechanically driven is referred to as a "drivable range".

1-2. Interchangeable Lens

The interchangeable lens 200 includes an optical system, a lens controller 240, and a lens mount 250. The optical system includes a zoom lens 210, an optical image stabilizer (OIS) lens 220, a focus lens 230, and a diaphragm 260.

The zoom lens 210 is a lens for changing the magnification of the subject image formed by the optical system. The zoom lens 210 includes at least one lens. The zoom lens 210 is driven by the zoom lens driver 211. The zoom lens driver 211 includes a zoom ring that can be operated by the user. Alternatively, the zoom lens driver 211 may include a zoom lever and an actuator or a motor. The zoom lens driver 211 moves the zoom lens 210 along the optical axis direction of the optical system according to the operation by the user.

The focus lens 230 is a lens for changing the focus state of the subject image formed on the image sensor 110 in the optical system. The focus lens 230 includes at least one lens. The focus lens 230 is driven by a focus lens driver 233.

The focus lens driver 233 includes an actuator or a motor, and moves the focus lens 230 along the optical axis of the optical system based on the control of the lens controller 240. The focus lens driver 233 can be implemented with a DC motor, a stepping motor, servo motor, an ultrasonic motor, or the like. Each of the lens controller 240 and the focus lens driver 233 is an example of the focusing driver in the digital camera 100.

The OIS lens 220 is a lens for correcting a blur of a subject image formed by the optical system of the interchangeable lens 200 in the OIS function (function to correct a camera shake by shifting the OIS lens 220). The OIS lens 220 reduces the blur of the subject image on the image sensor 110 by moving in a direction of offsetting the camera shake of the digital camera 1. The OIS lens 220 includes at least one lens. The OIS lens 220 is driven by an OIS driver 221.

The OIS driver 221 shifts the OIS lens 220 in a plane perpendicular to the optical axis of the optical system under the control of the OIS processor 223. The range in which the OIS lens 220 can be driven by the OIS driver 221 is mechanically limited. The range in which the OIS lens 220 can be mechanically driven by the OIS driver 221 is referred to as a drivable range. The OIS driver 221 can be implemented with a magnet and a flat coil, for example. A position sensor 222 is a sensor that detects the position of the OIS lens 220 in a plane perpendicular to the optical axis of the optical system. The position sensor 222 can be implemented, for example, with a magnet and a Hall element. The OIS processor 223 controls the OIS driver 221 based on the output of the position sensor 222 and the output of a gyro sensor 224 (camera shake detector).

The diaphragm 260 adjusts the amount of light incident on the image sensor 110. The diaphragm 260 is driven by a diaphragm driver 262, and the size of the opening is controlled. The diaphragm driver 262 includes a motor or an actuator.

The gyro sensor 184 or 224 detects the camera shake (vibration) in the yawing direction and the pitching direction based on an angular change per unit time, that is, an angular velocity, of the digital camera 1. The gyro sensor 184 or 224 outputs an angular velocity signal indicating the amount of the detected camera shake (angular velocity) to the BIS processor 183 or the OIS processor 223. The angular velocity signal output by the gyro sensor 184 or 224 may include a wide range of frequency components due to a camera shake, mechanical noise, or the like. Instead of the gyro sensor, another sensor capable of detecting the camera shake of the digital camera 1 can also be used.

The camera controller 140 and the lens controller 240 may include hard-wired electronic circuits, or may include a microcomputer using a program or the like. For example, the camera controller 140 and the lens controller 240 can be implemented with a processor such as a CPU, an MPU, a GPU, a DSP, an FPGA, or an ASIC.

2. Operation

The operation of the digital camera 1 configured as described above will be described below.

2-1. Wobbling Control

The digital camera 1 performs an autofocus operation (AF operation) using the contrast AF method. In the AF operation during moving image shooting, wobbling control is performed to move the focus lens 230 in the in-focus position direction while moving the focus lens 230 back and forth along the optical axis by a minute distance.

Figure 2:
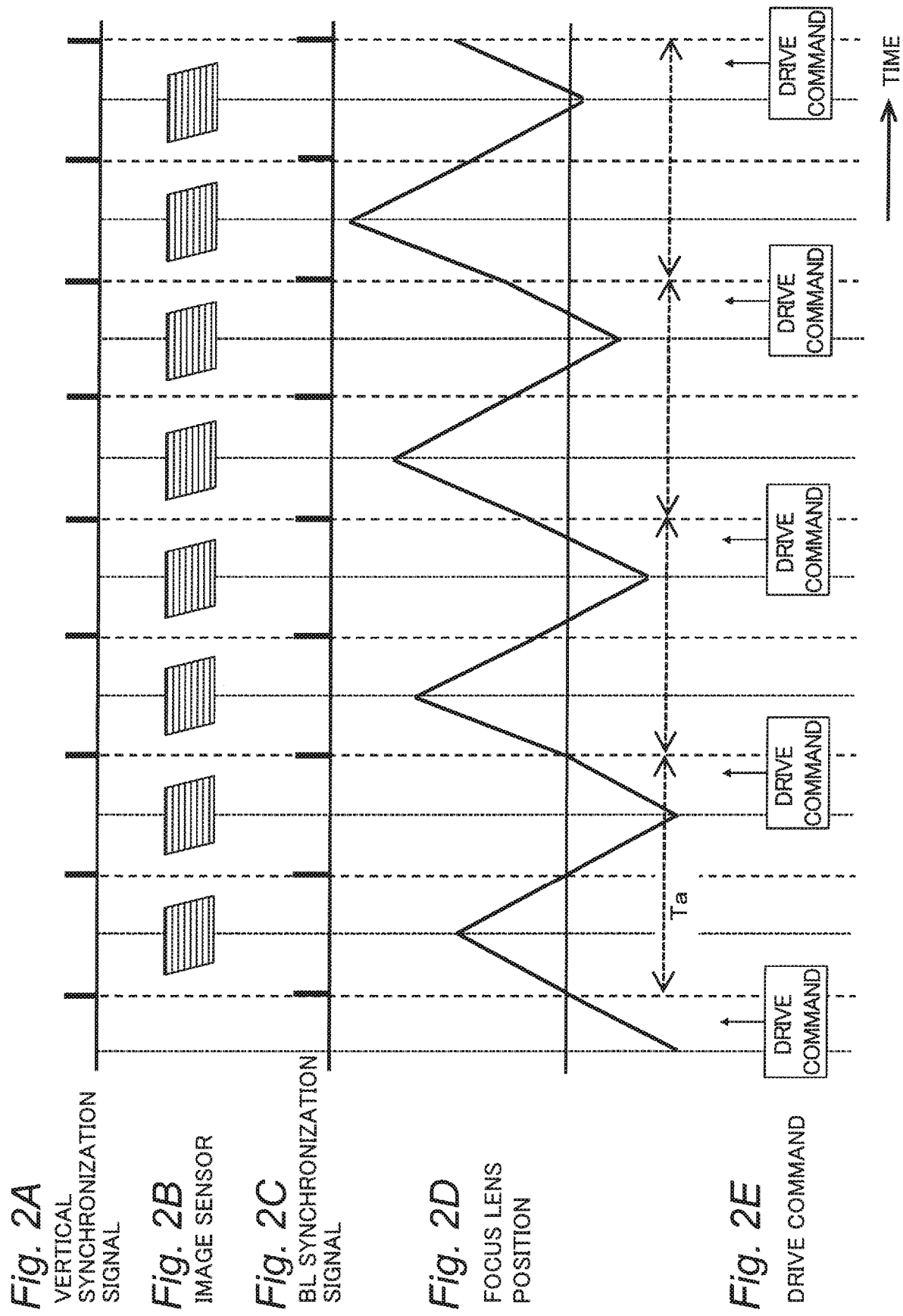
FIGS. 2A to 2E are diagrams illustrating a wobbling operation in the digital camera.

FIGS. 2A to 2E are diagrams illustrating a wobbling operation in the digital camera 1. FIG. 2A shows a vertical synchronization signal generated by the camera controller 140 of the camera body 100. FIG. 2E shows an imaging state by the image sensor 110. FIG. 2C shows a BL synchronization signal transmitted from the camera body 100 to the interchangeable lens 200. FIG. 2D shows the position of the focus lens 230 which changes by the wobbling operation. FIG. 2E shows a drive command for wobbling control transmitted from the camera controller 140 of the camera body 100 to the lens controller 240 of the interchangeable lens 200.

As shown in FIGS. 2A and 2B, the image sensor 110 in the camera body 100 captures a subject image in synchronization with the vertical synchronization signal (VD). At the same time, as shown in FIGS. 2C and 2D, the focus lens 230 in the interchangeable lens 200 is controlled with wobbling in synchronization with the imaging operation in the image sensor 110.

Specifically, the lens controller 240 receives a drive command for wobbling control from the camera controller 140. The lens controller 240 performs wobbling control of the focus lens 230 according to the drive command. At this time, when an image of a predetermined AF area is captured by the image sensor 110, the focus lens 230 is driven so that the displacement of the focus lens 230 is maximized, whereby the contrast value can be detected in the AF area.

The lens controller 240 performs wobbling control in synchronization with the BL synchronization signal received from the camera controller 140 (see FIG. 2E). In the example in FIG. 2E, the drive command is received every two frame periods. The camera controller 140 functions as a focusing driver in the camera body 100 by various kinds of control such as transmission of drive commands. Hereinafter, the period Ta of the oscillation in which the focus lens 230 moves back and forth by the wobbling control may be referred to as a "wobbling period".

2-2. Outline of Operation

The AF operation using the wobbling control as described above may cause fluctuation in an optical image magnification according to a position change in the focus lens 230. The present inventor has energetically conducted research on the influence of such fluctuations in image magnification on the appearance of captured moving images and the like, and has gained knowledge on techniques for effectively reducing quality deterioration of the images such as moving images. Hereinafter, the inventor's knowledge will be described with reference to FIGS. 3 and 4 together with an example of the operation of the digital camera 1 during moving image shooting.

Figure 3:
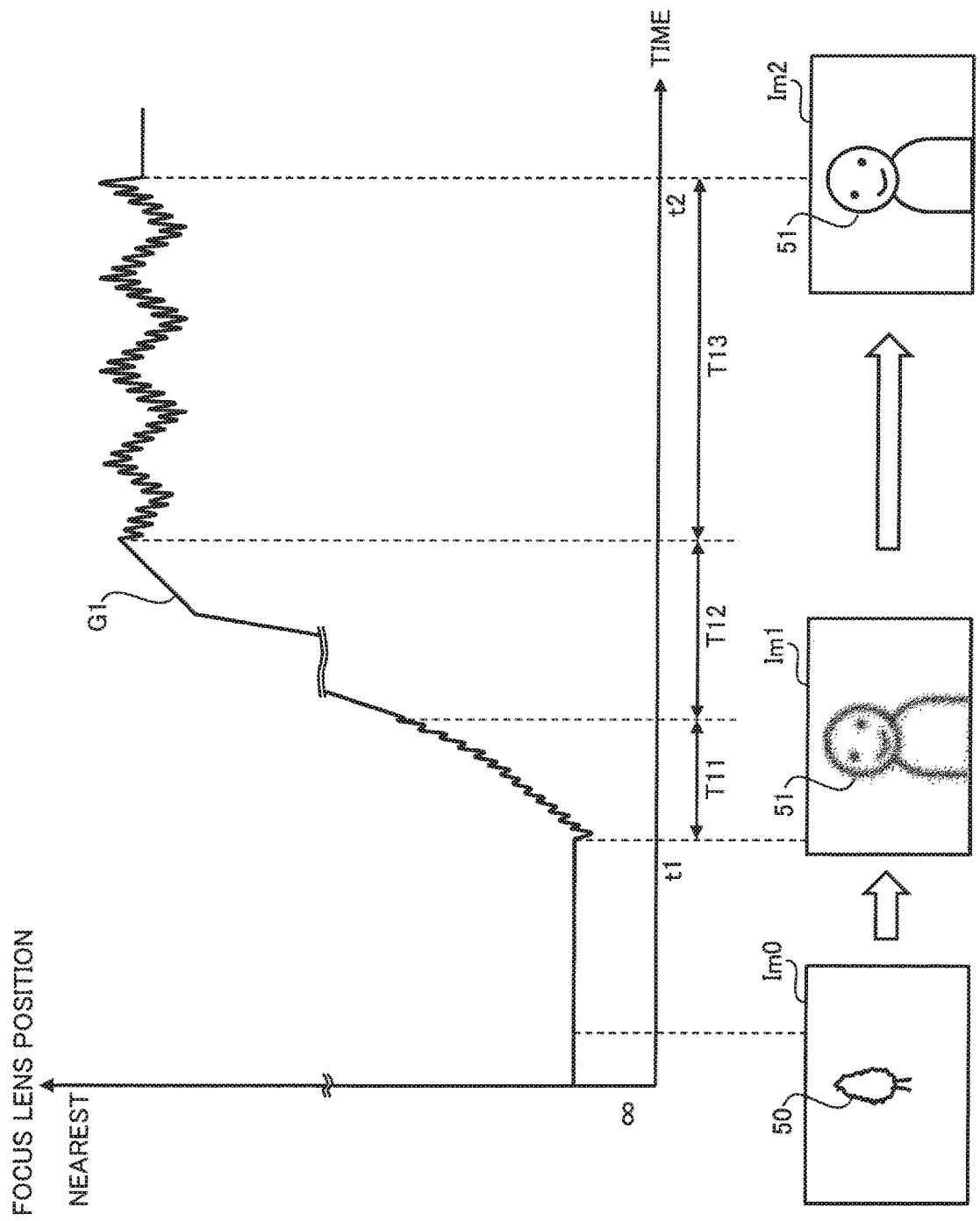
FIG. 3 is a diagram illustrating an AF operation during moving image shooting in the digital camera.

FIG. 3 is a diagram illustrating an AF operation during moving image shooting in the digital camera 1. In the graph G1 in FIG. 3, the horizontal axis indicates time, and the vertical axis indicates the focus lens position. The focus lens position is a position along the optical axis of the focus lens 230, and is defined between the nearest end where the focus is closest to the digital camera 1 and the infinity end where the focus is farthest. Hereinafter, out of two directions along the optical axis, one direction in which the focus lens position is directed toward the nearest end is referred to as "near direction", and the other direction toward the infinity end is referred to as "far direction".

FIG. 3 shows an operation example in a situation where the subject to be focused is changed during moving image shooting. In the present operation example, the digital camera 1 is focused on the subject 50 such as the background in the initial captured image Im0. A new subject 51 such as a person is reflected in the captured image Im1 at the time t1 thereafter. In the present example, the new subject 51 is located at a closer distance than the initial subject 50.

After time t1, various operating state for performing AF operation using wobbling control are made in periods T11, T12, and T13, and then the digital camera 1 obtains a captured image Im2 in which focusing on a new subject 51 is completed at time t2. Such a shooting situation is assumed when the subject 51 moves or the photographer changes the shooting range.

As to the AF operation in FIG. 3, the period T11 is a period for a wobbling movement state in which the focus lens 230 moves to one direction (e.g., the near direction in the present example) while oscillating due to the wobbling operation. For each moving of the focus lens position back and forth in wobbling control, the digital camera 1 repeatedly determines the direction in which the focus lens position is to be moved, from the viewpoint of comparing AF evaluation values (e.g., contrast values) for each frame. In this operation, when the determined direction is consecutively in the same direction, the AF operation is to be in an operation state as in the period T11.

The next period T12 is a period for a search movement state in which the focus lens 230 moves in one direction (e.g., the near direction in the present example) without causing the oscillation of the wobbling operation when the number of times the above-described determined direction is consecutively in the same direction (i.e., the number of consecutive times) exceeds the predetermined specific number, the digital camera 1 omits the wobbling control and executes the AF operation toward the determined direction. Such an operation state continues until the peak of the AF evaluation value (or the presence of the in-focus position) is confirmed, for example.

The period T13 is a period for an operation state in which the wobbling operation is performed in the vicinity of the in-focus position. The AF operation in the period T13 is in an operation state such as to swing back and forth around the in-focus position (hereinafter referred to as "wobbling swing state") in addition to the oscillation of the wobbling period Ta by the wobbling control. The wobbling swing state will be described with reference to FIG. 4.

Figure 4:
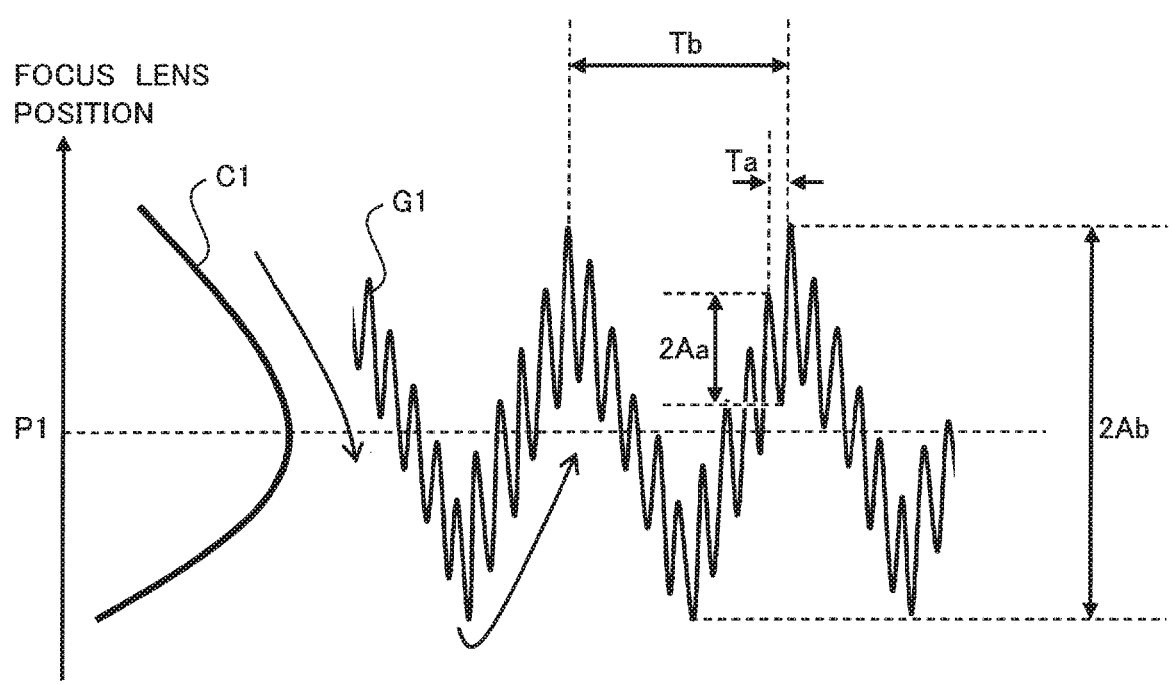
FIG. 4 is a diagram for illustrating a wobbling swing state in the digital camera.

FIG. 4 illustrates a contrast curve C1 when the subject 51 and the like are stationary in the period T13. The moving direction of the focus Lens position (or the determined direction of wobbling control) is reversed when the descending gradient of the contrast curve C1 is detected from the AF evaluation values sequentially acquired during the AF operation.

Since the contrast curve C1 such as during the period T13 can dynamically change depending on the movement of the subject 51 or the like, it is conceivable that detection for one time is difficult to obtain high accuracy for detecting the in-focus position P1. Thus, the digital camera 1 continues the wobbling control until, for example, the number of times the determined direction of the wobbling control is reversed exceeds a predetermined number of times. The predetermined number of times is set, for example, from the viewpoint of the stability of AF evaluation values obtained sequentially, and e.g., 1 to 10 times. As described above, the AF operation can be in a wobbling swing state.

The change in the focus lens position in the wobbling swing state includes a wobbling component being a frequency component based on the wobbling Period Ta, and a swing component being a lower frequency component than the wobbling component. The swing component is based on a swing period being longer than the wobbling period Ta. For example, the wobbling period Ta is set to a period of two frames, but the swing period Tb can change due to various factors in a plurality of times the wobbling period Ta. The factors include a factor that changes the contrast curve C1 in various shooting situations.

In addition, an amplitude Aa of the wobbling component is set according to a distance less than the depth of field, for example, and corresponds to a distance half or less of the depth of field, for example. On the other hand, an amplitude Ab of the swing component corresponds to a distance equal to or more than the depth of field, for example, and may change due to the above factors. The range estimated to include the swing component amplitude Ab and the swing period Tb can be calculated in the digital camera 1 based on various parameters such as the current diaphragm value.

Returning to FIG. 3, the digital camera 1 detects the in-focus position P1 based on the AF evaluation value obtained in the wobbling swing state, for example, and moves the focus lens 230 to the in-focus position P1 at the terminating end of the period T13. Then, the digital camera 1 stops the focus lens 230, for example, after time t2 when the movement to the in-focus position P1 is completed.

As for the influence of the image magnification that fluctuates in the various operation states of the AF operation as described above, the present inventor has energetically conducted research considering the appearance of the moving image in the wobbling swing state as in the period T13. According to this energetic research, it has found that the wobbling component is less likely to influence to the appearance of the moving image in the wobbling swing state, but the swing component is likely to influence and would significantly reduce the image quality.

That is, due to the influence of the swing component, the moving image of the period T13 in the wobbling swing state would be a moving image in which the whole image is repeatedly enlarged and reduced over multiple frames corresponding to the swing period Tb while the new subject 51 is almost in focus. If a viewer views the fluctuation of the image magnification due to the swing component, it is conceivable that the whole image appears to swing unstably although the image is almost in focus. Thus, it causes such an impression that the image quality is remarkably low.

On the other hand, the wobbling component includes the amplitude Aa smaller than the amplitude Ab of the swing component and the wobbling period Ta shorter than the swing period Tb, so that the image quality is less likely to be affected than that of the swing component. In addition, since the corresponding enlargement and reduction of the image magnification alternate for each frame, it is expected that the wobbling component is less likely to influence the collective view of the multiple frames, which undergoes various frame processing before the time of display.

Furthermore, in the periods T11 and T12 not in the wobbling swing state, it is conceivable that fluctuation in image magnification such that either one of enlargement or reduction continues could be viewed during changing the focusing state with out of focus, for example. It is considered that such fluctuation in image magnification is less likely to be recognized by the viewer as a reduction in image quality than the above-described influence of the swing component.

Therefore, the digital camera 1 of the present embodiment executes an electronic zoom (hereinafter referred to as "electronic zoom correction processing"), that is, image processing for scaling the image to correct fluctuations in image magnification within the range presumed as the swing component in the wobbling swing state, at the time of shooting a moving image, for example. Limiting the object to be corrected by the electronic zoom to the swing component in the wobbling swing state makes it possible to achieve electronic zoom correction processing that efficiently reduces the degradation of image quality.

Hereinafter, details of the operation of the digital camera 1 according to the present embodiment will be described.

2-3. Electronic Zoom Correction Processing

Electronic zoom correction processing in the digital camera 1 of the present embodiment will be described with reference to FIGS. 5 to 8. An example of the electronic zoom correction processing described in the following is a processing example in which the scaling of image data is controlled for each frame period.

Figure 5:
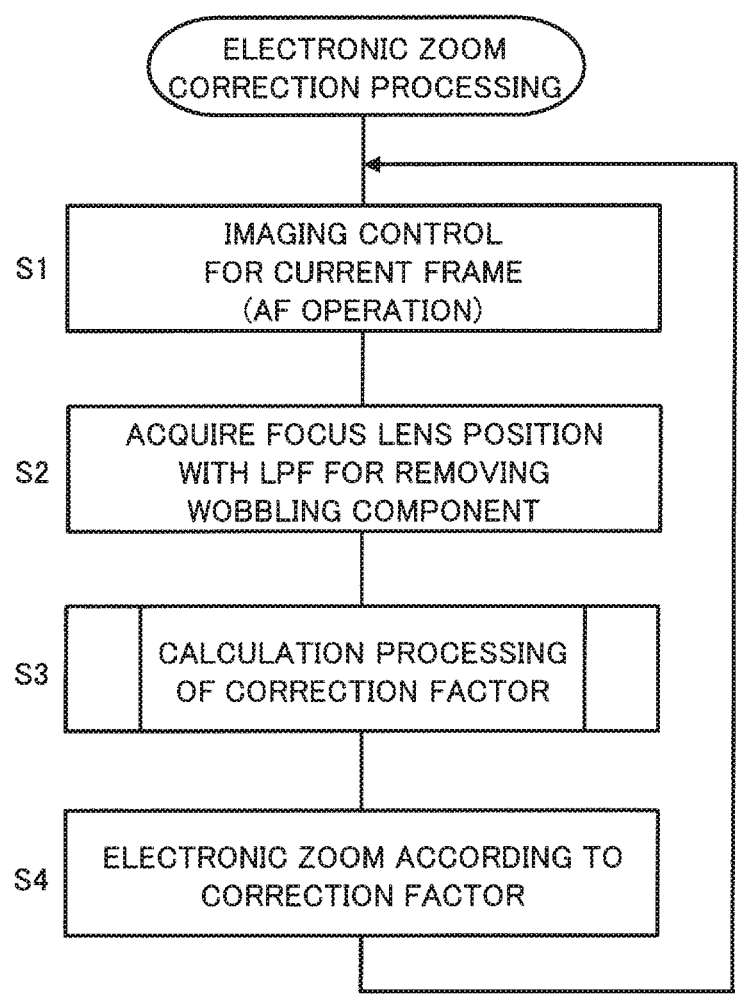
FIG. 5 is a flowchart illustrating electronic zoom correction processing in the digital camera.

FIG. 5 is a flowchart illustrating electronic zoom correction processing in the digital camera 1. The processing shown in the present flowchart starts in a state where information indicating the correspondence between the focus lens position and the image magnification is stored in the RAM 141 or the like of the camera body 100, for example, and is executed by the camera controller 140, for example. The correspondence is illustrated in FIG. 6.

Figure 6:
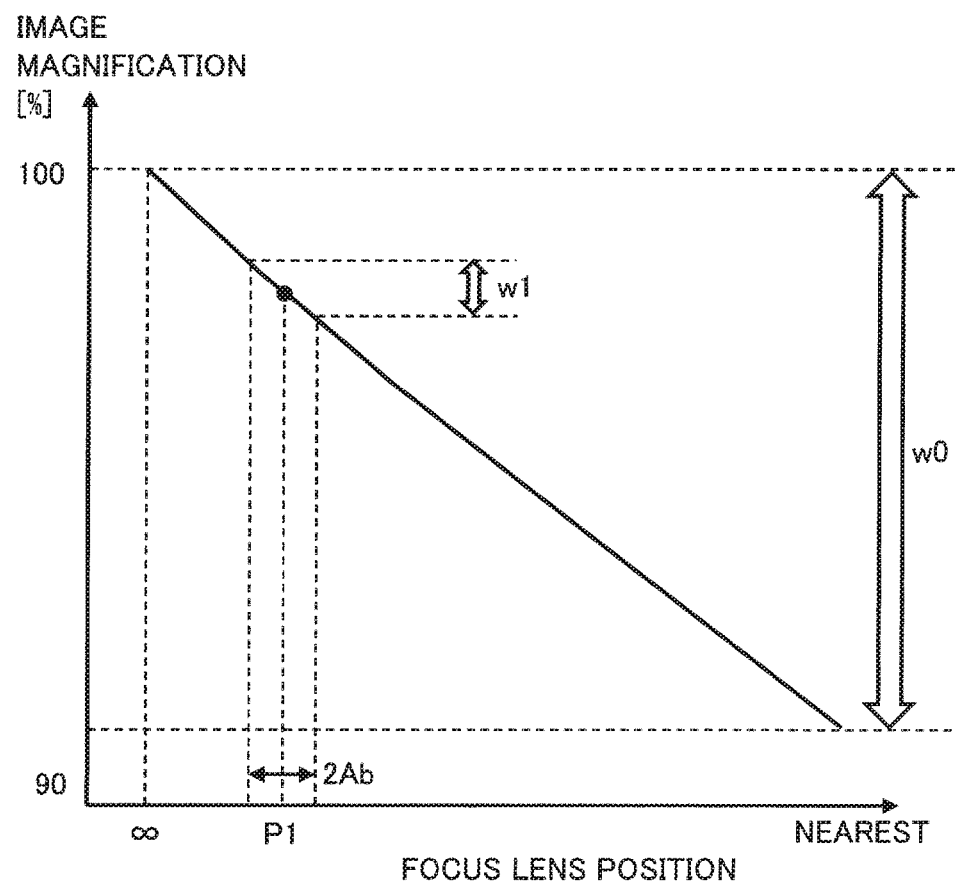
FIG. 6 is a diagram illustrating a correspondence between the focus lens position and the image magnification of the digital camera.

In the graph in FIG. 6, the horizontal axis indicates the focus lens position, and the vertical axis indicates the image magnification. In the present example, the image magnification is normalized with the focus lens position at the infinity end as 100%. Such a correspondence is defined based on the characteristics of the interchangeable lens 200, and may be remarkable in a small or thin interchangeable lens, for example. In the interchangeable lens 200 including the zoom lens 210, the above correspondence may be changed according to the zoom lens position.

Information indicating the correspondence as in FIG. 6 is stored in advance in the flash memory 242 of the interchangeable lens 200, for example. For example, when the interchangeable lens 200 is attached or the power is turned on, the camera controller 140 of the digital camera 1 acquires information indicating the above correspondence via data communication with the lens controller 240 to store the information in the RAM 141 or the like.

In the flowchart in FIG. 5, at first, the camera controller 140 performs various imaging control for capturing an image of one frame, and acquires image data indicating the imaging result of the current frame (S1). The imaging control in step S1 includes control of AF operation using, for example, wobbling control. Hereinafter, the number n is used to represent the current frame in ascending order from n=1.

Furthermore, the camera controller 140 acquires information indicating the focus lens position corresponding to the current (i.e., the n-th frame) image data, for example, via data communication with the lens controller 240 (S2). The processing in step S2 is performed as a low-pass filter (LPF) for removing the above-described wobbling component from a sequence of the focus lens positions driven in the AF operation. An example of LPF for removing the wobbling component (S2) will be described with reference to FIGS. 7A and 7B.

Figure 7A:
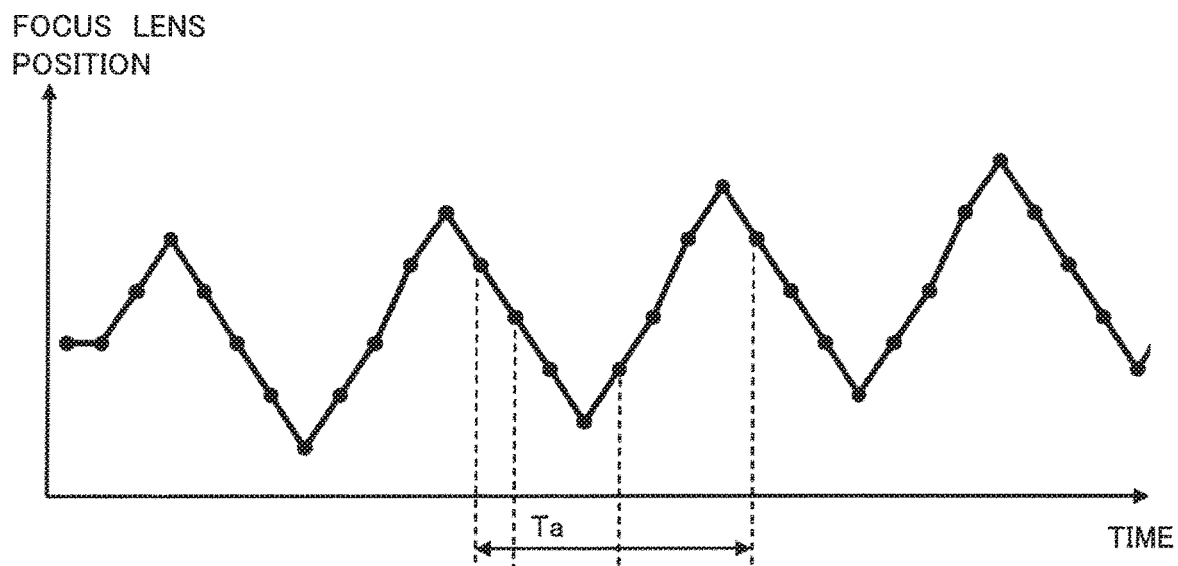
FIGS. 7A and 7B are diagrams illustrating an example of a low pass filter (LPF) for removing wobbling component.
Figure 7B:
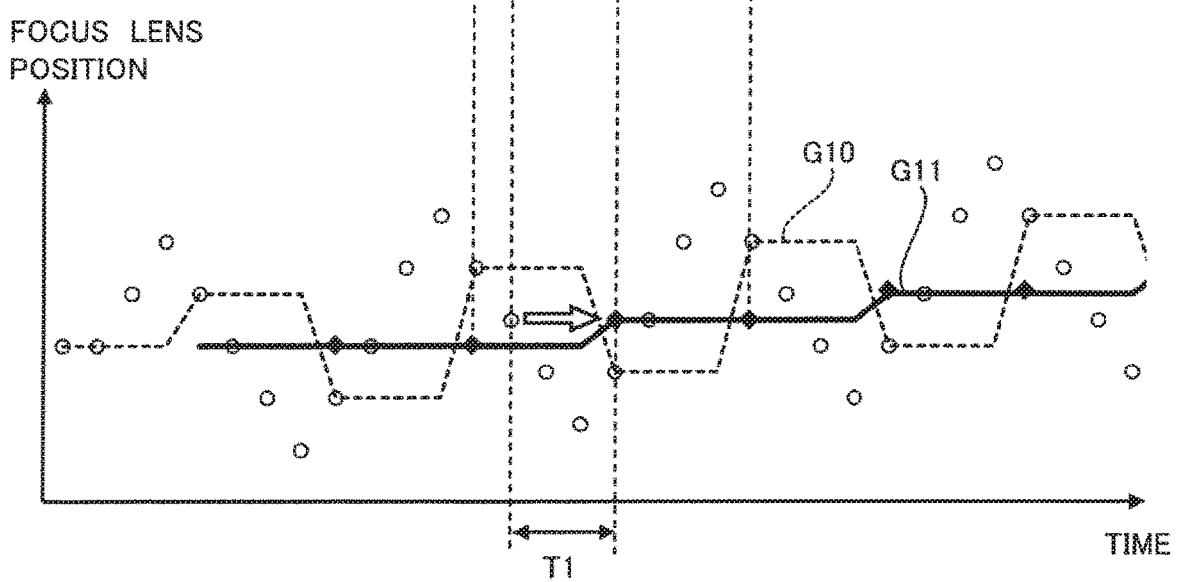

FIG. 7A illustrates a focus lens position during the wobbling operation. FIG. 7B illustrates a focus lens position acquired with or without LPF during the operation in FIG. 7A. FIGS. 7A and 7B show a case where the lens controller 240 can acquire four points of focus lens positions every frame period Tf (for example, Ta/2) as an example.

The LPF in the present example is realized by timing control that samples the focus lens position after a lapse of a specific phase period T1, when the camera controller 140 acquires the focus lens position every frame period Tf (S2). In FIG. 7B, a graph G10 illustrates a case where LPF timing control is not performed. In this case, the focus lens position to be sampled includes a wobbling component displaced every wobbling period Ta as shown in the graph G10.

On the other hand, the graph G11 in FIG. 7B illustrates a case where the LPF timing control is performed (32). In this case, the wobbling component is blocked more than that in the case of the graph G10, by sampling the focus lens position at the timing delayed by the phase period T1. In this case, as shown in the graph G11, a lower frequency component than the wobbling component can be extracted from the actual change of the focus lens position (in FIG. 7A), and thus LPF can be realized.

As shown in FIG. 7B, the phase period T1, of the above timing control is set to the period to the acquiring timing from the timing, where the displacement of the focus lens position is minimum in the wobbling control among the focus lens positions that can be acquired per frame period Tf, such as the above four points. In the control of the AF operation, the timing where the displacement of the focus lens position is maximum in the wobbling control is set as the timing where the AF area is imaged. From this viewpoint, the camera controller 140 or the like can set the phase period T1 based on the relative timing between the wobbling control and the imaging operation, for example.

Returning to FIG. 5, the camera controller 140 performs processing of calculating a correction factor V(n) for correcting the image magnification by electronic zoom (that is, calculation processing of a correction factor) according to the acquired focus lens position (S3). The correction factor V(n) will be described with reference to FIG. 8.

Figure 8:
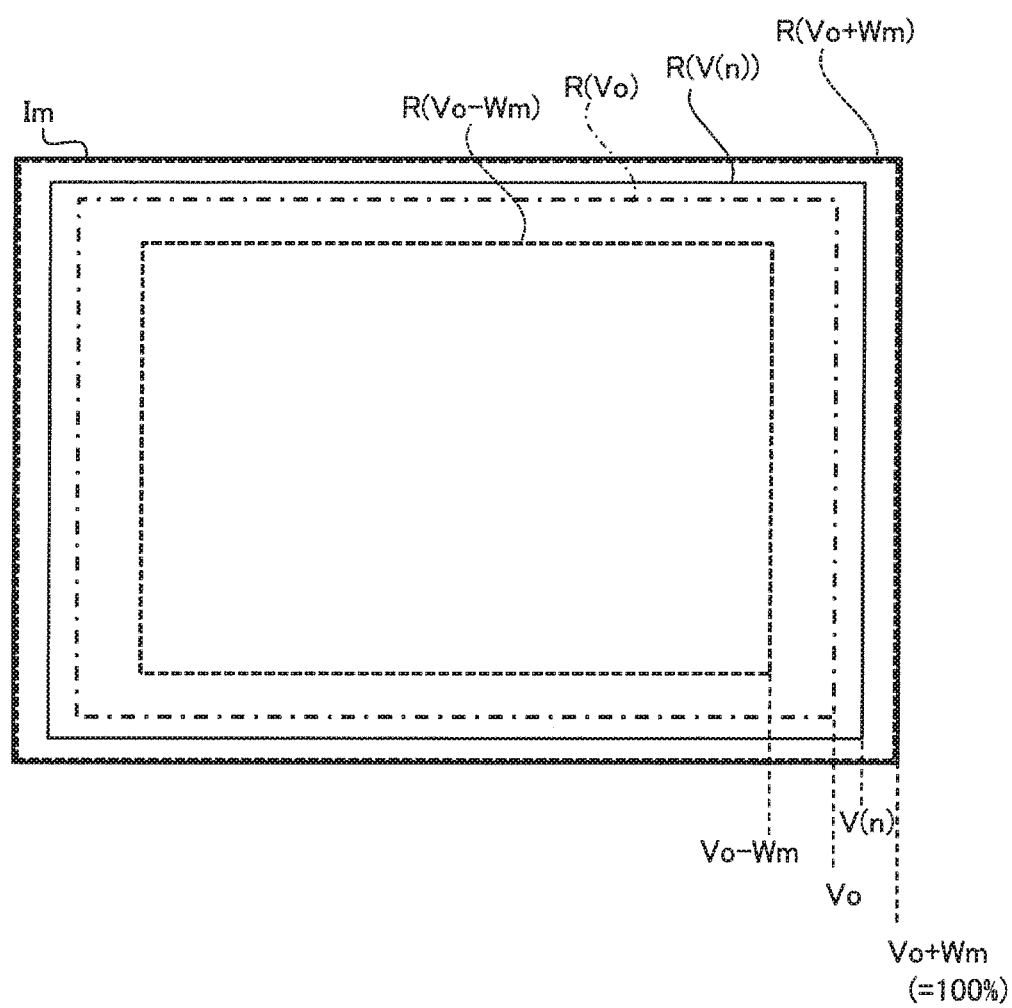
FIG. 8 is a diagram for illustrating the correction factor for electronic zoom correction processing.

FIG. 8 shows a correction target region P in the electronic zoom correction processing in the image Tm for one frame. The correction factor V(n) indicates the ratio of the correction target region R(V(n)), which is to be enlarged by the electronic zoom, to the whole image of the n-th frame. The correction factor V(n) is expressed in % units, for example. The correction target region R is set so that the center position and the aspect ratio are the same as those of the whole image, for example.

In the present embodiment, the correction factor V(n) is limited within a range of a predetermined width (set as "2 Wm") from an upper limit value of 100%. The correction factor V(n) is expressed as in the following Formula (1) by using a reference correction factor Vo within the range.

$$V(n) = Vo + W(n) \quad (1)$$

In the above Formula (1), W(n) is the change amount from the reference correction factor Vo in the correction factor V(n) of the n-th frame. The change amount W(n) has an upper limit value Wm and a lower limit value −Wm. The reference correction factor Vo is a correction factor set in advance as a reference value. For example, Vo=99.75% when the predetermined width is 2 Wm=0.5%. In the present embodiment, the processing in step S3 is performed so as to achieve centering control that gets the correction factor V(n) closer to the reference correction factor Vo by attenuating the change amount W(n) when the change amount W(n) would be excessive. Details of the correction factor calculation processing (S3) will be described later.

Next, the camera controller 140 performs image processing for correcting the image data of the n-th frame with the electronic zoom according to the calculated correction factor V(n) (S4). Specifically, the camera controller 140 cuts out the image of the correction target region R(V(n)) on the image data, and performs scaling so as to enlarge the image of the region R(V(n)) at an electronic zoom magnification Z complementary to the correction factor V(n). The complementary electronic zoom magnification Z (for example, Z=100/V(n)) obtains image data indicating an image of the correction target region R(V(n)) at the same image size as before correction.

The camera controller 140 repeatedly executes the above processing every frame, for example. The number n is incremented every frame period Tf. The image data after correction is recorded as a moving image, for example. The image data after correction may be displayed as a through image.

According to the above electronic zoom correction processing, even if the optical image magnification fluctuates due to change in the focus lens position during an AF operation with wobbling control or the like, the image data is corrected by the correction factor V(n) by the electronic zoom, and thus deterioration in the image quality can be reduced. At this time, the LPF processing (S2) on the wobbling component can reduce the processing load of the electronic zoom correction processing and can efficiently cause the correction factor V(n) to follow the swing component.

In step S2, the phase period T1 used for the LPF processing is not limited to the delay period, but may be an advanced period. For example, the camera controller 140 can perform a computation for predicting the advanced focus lens position by the phase period T1, based on the control information on the AF operation.

In the electronic zoom correction processing of the present embodiment, the correction factor V(n) is controlled in the vicinity of the reference correction factor Vo (S3). For example, applying an electronic zoom magnification Z with a correction factor V(n)=Vo the normal time, which is a time when the focus lens position does not change, allows the electronic zoom magnification Z to be increased or decreased within a preset range Vo±Wm when the focus lens position changes.

If the width Wm were set excessively, influence that the reduction in the reference correction factor Vo (=100−Wm) and the reduction, at the normal time, in the correction target region R(Vo) could cause the angle of view to be narrowed or the resolution to be lowered. FIG. 6 illustrates the fluctuation width w0 of the image magnification when the focus lens position changes via the whole range from the infinity end to the close end, and the fluctuation width w1 corresponding to twice the amplitude Ab of the swing component. The fluctuation width w1 of the swing component is significantly smaller than fluctuation width w0 of the whole range. From the viewpoint of reducing the above influence, the predetermined width 2 Wm can be set to be sufficiently smaller than the fluctuation width w0 of the whole range and equal to or larger than the fluctuation width w1 of the swing component.

In the calculation processing of the correction factor (S3) of the present embodiment, in order to effectively utilize the small predetermined width 2 Wm as described above, the centering control for attenuating the change amount W(n) of the correction factor V(n) is performed when the change in the focus lens position is large as in the periods T11 and T12 in FIG. 3. Thus, when the wobbling swing state as in the period T13 is entered, the correction factor V(n) can be changed within the predetermined width 2 Wm. Therefore, correction for the fluctuation width w1 of the swing component can be performed efficiently. Details of the processing in step S3 will be described below.

2-4. Calculation Processing of Correction Factor

Figure 9:
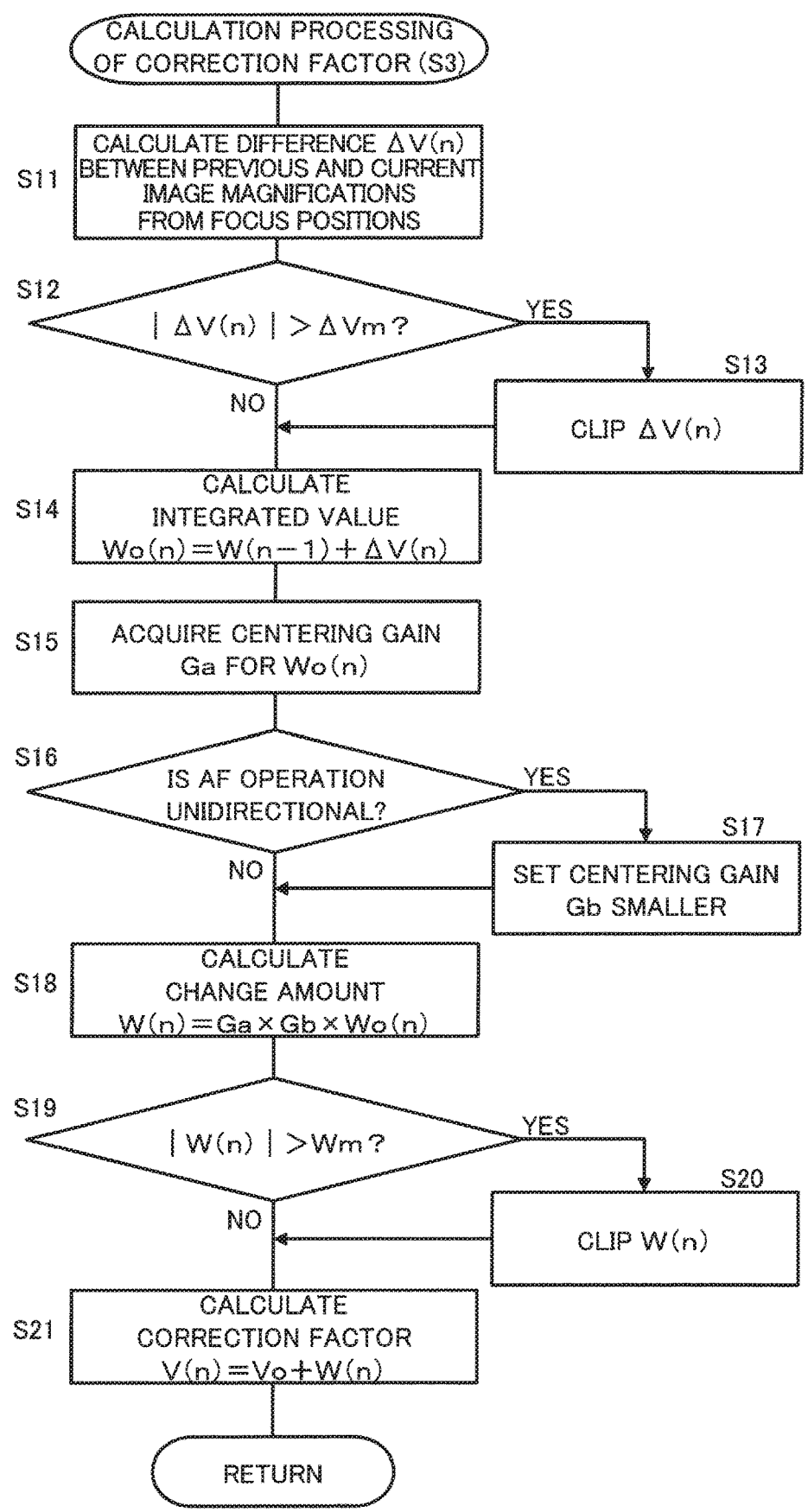
FIG. 9 is a flowchart illustrating the calculation processing of the correction factor in the digital camera.

The calculation processing of the correction factor (S3) in FIG. 5 will be described with reference to FIGS. 9 to 12. FIG. 9 is a flowchart illustrating the calculation processing of the correction factor in the digital camera 1.

At first, based on focus lens position the acquired in the LPF processing (S2 in FIG. 5), the camera controller 140 calculates the difference ΔV(n) between the current (n-th frame) image magnification and the previous ((n−1) th frame) image magnification (S11).

The processing in step S11 is performed with reference to the information indicating the correspondence between the focus lens position and the image magnification as shown in FIG. 6, for example. As an example where the image magnification corresponding to the focus lens position of the (n-1) th frame is 99.85% and the image magnification corresponding to the focus lens position of the n-th frame is 99.90%, the camera controller 140 calculates the difference ΔV(n)=0.05% (S11).

Next, the camera controller 140 determines whether the magnitude of the calculated difference ΔV(n) (i.e., absolute value |ΔV(n)|) is larger than a predetermined value ΔVm (S12). The predetermined value ΔVm is set to a maximum value presumed as a difference of image magnification between frames in which the above-described swing component is to be corrected, for example.

When determining that the magnitude of the calculated difference |ΔV(n)| is larger than the predetermined value ΔVm (YES in S12), the camera controller 140 clips the difference ΔV(n) (S13). For example, when ΔV(n)>ΔVm, the camera controller 140 rewrites the value of the difference ΔV(n) stored as the calculation result to "ΔVm". Also, when ΔV(n)<−ΔVm, the camera controller 140 rewrites the value of the difference ΔV(n) to "−ΔVm".

On the other hand, when determining that the magnitude of the calculated difference ΔV(n) is not larger than the predetermined value ΔVm (NO in S12), the camera controller 140 does not particularly perform the processing in step S13 but uses the value of the difference ΔV(n) calculated in step S11 for the processing in step S14.

Next, the camera controller 140 calculates the integrated value Wo(n) regarding the current change amount W(n) by adding the difference ΔV(n) to the previous integration result (S14). The integrated value Wo (n) is expressed as the following Formula (2) by using, for example, the previous change amount W(n−1).

$$Wo(n)=W(n-1)+\Delta V(n) \quad (2)$$

The camera controller 140 acquires a centering gain Ga according to the calculated current integrated value Wo(n) (S15). The centering gain is gain for attenuating the change amount W(n) with respect to the integrated value Wo(n) for centering control, and is set within a range of 0 to 1, for example. The centering gain Ga in step S15 will be described with reference to FIG. 10.

Figure 10:
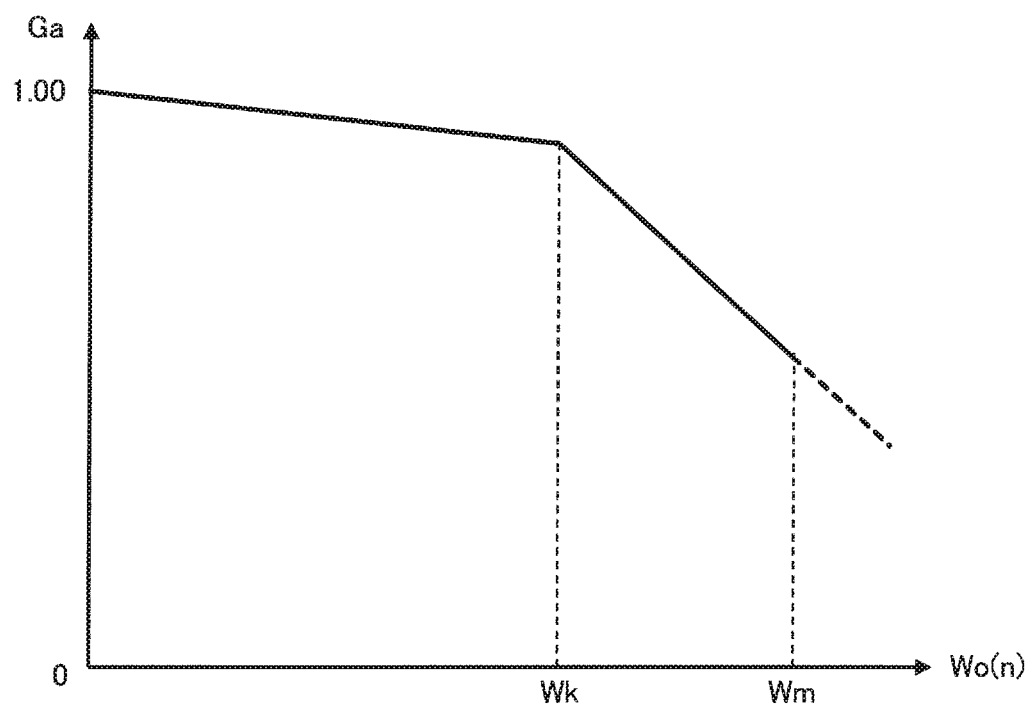
FIG. 10 is a diagram for illustrating a centering gain in the calculation processing of the correction factor.

FIG. 10 illustrates a correspondence between the integrated value Wo(n) and the centering gain Ga. For example, the centering gain Ga has a value "1" when |Wo(n)|=0, and is set to decrease as the magnitude of integrated value |Wo(n)| increases. In the example in FIG. 10, the gradient decreasing the centering gain Ga is relatively gentler in a range where the magnitude of the integrated value |Wo(n)| does not exceed the predetermined value Wk, and steeper in a range of Wk<|Wo(n)|<Wm. The predetermined value Wk is set to the maximum value of the change amount W(n) presumed for the wobbling swing state when the typical interchangeable lens 200 is used, for example.

It is considered that the integrated value Wo(n) may exceed the upper limit value Wm of the change amount W(n) or falls below the lower limit value −Wm. Thus, the correspondence between the integrated value Wo(n) and centering gain Ga is defined over a range wider than the range Wm to −Wm, for example. The centering gain Ga in the case of |Wo(n)|>Wm may have the same value as in the case of |Wo(n)|=Wm, or may have a value further reduced from this value.

The information indicating the correspondence as described above (FIG. 10) is stored in advance in the flash memory 142 of the camera body 100, for example. In step S15, by referring to the information stored in the flash memory 142 the camera controller 140 acquires the centering gain Ga corresponding to the current integrated value Wo(n).

Returning to FIG. 9, the camera controller 140 refers to various control information for the AF operation, to determine whether the operation state of the current AF operation is a unidirectional movement state, that is, an operation state that continuously moves in one direction of the near direction and the far direction (S16). For example, each of the wobbling movement state (T11 in FIG. 3) and the search movement state (T12) described above is the unidirectional movement state of the AF operation (YES in S16). On the other hand, the wobbling swing state (T13) does not correspond to the unidirectional movement state (NO in S16).

The determination in step S16 is performed based on, for example, whether the wobbling control is under executed, and whether the continuous number of times in the determined direction of the wobbling control exceeds a predetermined number of times during the execution. The predetermined number of times is set to be larger than the number of tims presumed as a continuous number of times until the determined direction is reversed in the wobbling swing state, and set to be equal or less than the defined number of times for shifting to the search movement state, for example.

When determining that the current AF operation is in the unidirectional movement state (YES in S16), the camera controller 140 sets a centering gain Gb other than the Ga to a value smaller than "1" (e.g., "0.8"), for example (S17). When it is determined that the current AS operation is not in the unidirectional movement state (NO in S16), the centering gain Gb is set to "1".

Based on the centering gains Ga and Gb and the integrated value Wo(n), the camera controller 140 calculates the current change amount W(n) (S17). The calculation of the change amount W(n) is performed, for example, by the calculation of the following Formula (3).

$$W(n) = Ga \times Gb \times Wo(n) \quad (3)$$

The camera controller 140 determines whether the magnitude of the calculated change amount W(n) (that is, absolute value |W(n)|) is larger than the upper limit value Wm, for example (S19). When determining that the magnitude of the change amount |W(n)| is not larger than the upper limit value Wm (NO in S19), the camera controller 140 uses the value of the change amount W(n) obtained in step S17 for the processing in step S21.

On the other hand, when determining that the magnitude of the calculated change amount |W(n)| is larger than the upper limit value Wm (YES in S19), the camera controller 140 clips the change amount W(n) (S20). For example, when W(n)>Wm, the camera controller 140 changes the value of the change amount W(n) to "Wm". Also, when W(n)<−Wm, the camera controller 140 changes the value of the change amount W (n) to "−Wm".

Based on the change amount W(n) obtained as described above, the camera controller 140 performs calculation of the above-described Formula (1) to calculate the correction factor V(n) (S21). Then, the camera controller 140 ends the calculation processing of the correction factor (S3 in FIG. 5), and proceeds to step S4.

According to the above calculation processing of the correction factor, various centering control and clip processing can reduce the change amount W(n) when the change in the focus lens position is not a target to be corrected, and thereby can control the correction factor V(n) so that the correction factor follows the swing component to be corrected. This point will be described with reference to FIGS. 11 and 12.

Figure 11:
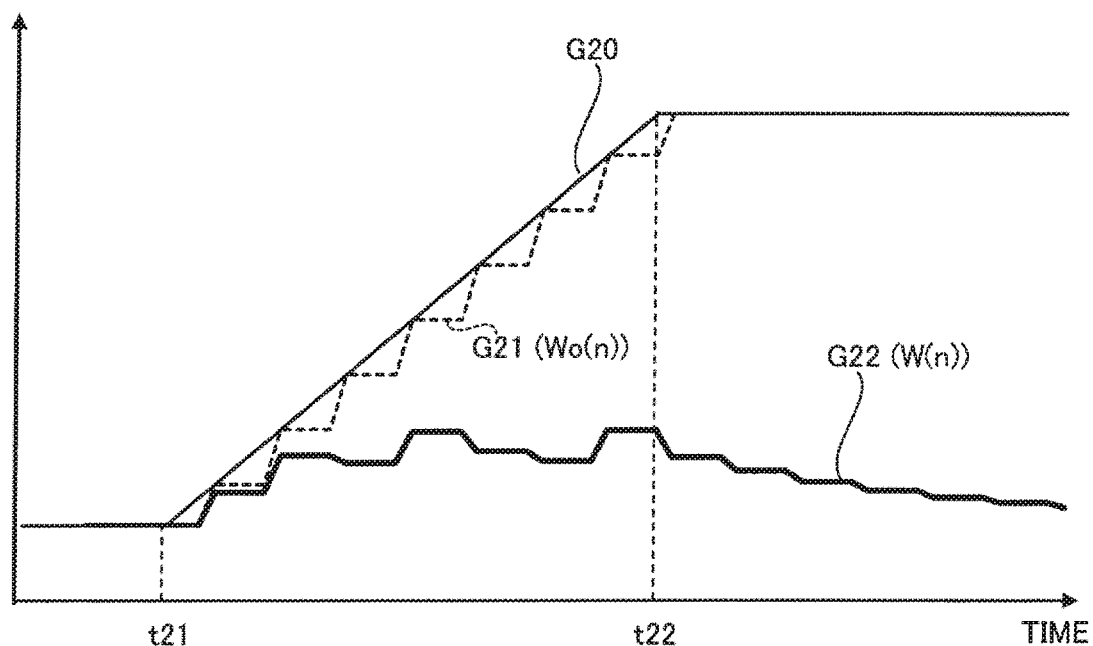
FIG. 11 is a diagram illustrating the centering control in the calculation processing of the correction factor.

FIG. 11 is a diagram illustrating the centering control in the calculation processing of the correction factor. FIG. 11 illustrates a graph G20 of a sequence of the focus lens positions, a graph G21 of an integrated value Wo(n), and a graph G22 of a change amount W(n). The graphs G21 and G22 correspond to before and after the centering control.

In the example in FIG. 11, a case is assumed where the AF operation is not in the wobbling swing state be corrected. As shown in the graph G20, the focus lens position moves in one direction from the time t21 and stops at the subsequent time t22. As shown in the graph G21, the integrated value Wo(n) continues to increase from time t21 and becomes constant after time t22.

On the other hand, the change amount W(n) increases from time t21 as shown in the graph G22. However, centering control (S15 to S17), the change amount W(n) decreases before reaching time t22, and also after time t22, decreases gradually. Thus, when the AF operation is not in the wobbling swing state that is the target to be corrected, the change amount W(n) can be attenuated, resulting in the correction factor V(n) to be closer to the reference correction factor Vo. This makes it possible to improve the accuracy to perform correction when the swing component arises.

For example, the centering gain Ga in step S15, as shown in FIG. 10, allows the change amount W(n) to be attenuated as the magnitude of the integrated value Wo(n) increases. In particular, when the predetermined value Wk presumed for correction target is exceeded, the change amount W(n) can be further attenuated. by the centering gain Ga having the steeper gradient. In addition, the centering gain Gb in step S17, which refers to the operation state of the AF operation, allows the change amount W(n) to be further attenuated when the AF operation is in the unidirectional movement state.

As described above, according to the centering control using the centering gains Ga and Gb (S15 to S17) the magnitude of the change amount W(n) can be reduced as the change in the focus lens position is biased toward one direction of the near direction and the far direction.

Figure 12:
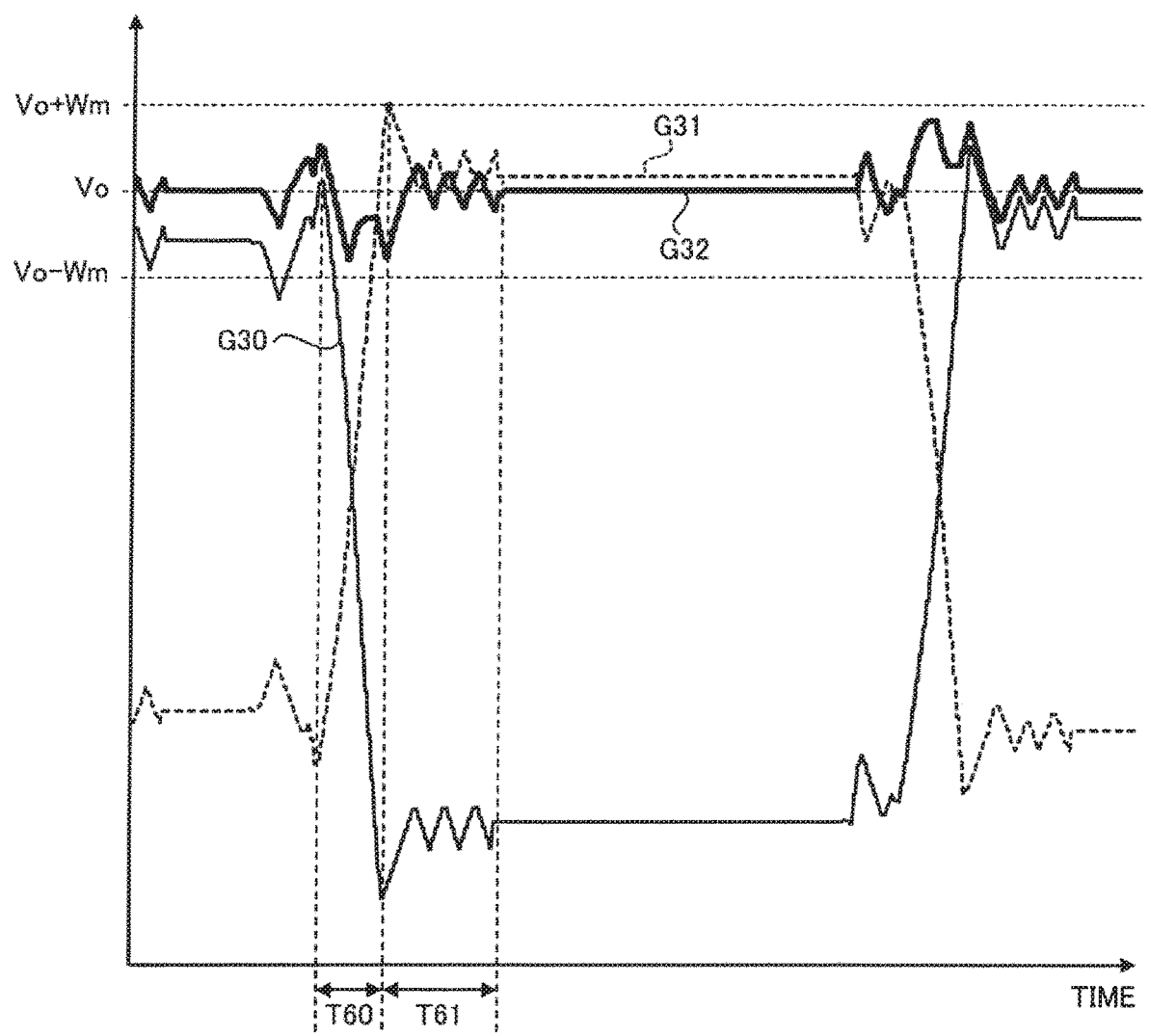
FIG. 12 is a diagram illustrating the following of the correction factor with respect to the focus lens position.

FIG. 12 is a diagram illustrating the following of the correction factor with respect to the focus lens position. FIG. 12 illustrates a graph G30 of a sequence of the focus lens positions, an optical image magnification graph G31, and a correction factor V(n) graph G32. In FIG. 12, the illustration of the wobbling component is omitted.

As shown in the graph G30, the example in FIG. 12 includes a period T60 in which the AF operation is the unidirectional. Movement state and a period T61 in which the AF operation is the wobbling swing state. As shown in the graph G31, the optical image magnification changes greatly in the period T60, for example. On, the other hand, the correction factor V(n) of the present embodiment is controlled to be close to the reference correction value Vo during the period T60 of the unidirectional movement state as shown in the graph G32, by centering control or the like. According to this, in the subsequent period T61 of the wobbling swing state, the correction factor V(n) can be made to follow the swing component of the focus lens position within the limited range of the width 2 Wm, shown in the graphs G30 and G32.

In addition, according to the above steps S12 to S13, the clip processing on the difference ΔV(n) of image magnification between frames is performed. The time when the difference ΔV(n) is excessive (YES in S12) can be considered as the time when the focus lens position is rapidly moved to the in-focus position at the end of the AF operation, such as at the terminating end of period T3 in FIG. 3. At this time, the electronic zoom correction can be performed softly rather than strictly, so that a better appearance can be obtained. Therefore, clipping the difference ΔV(n) at such time (S13) allows better image quality to be obtained.

In addition, according to the above steps S19 to S20, the clip processing is performed. on the change amount W(n). Thus, the change amount W(n) can be limited within the range of the predetermined width ±Wm. Note that each clip processing described above is an example, and is not particularly limited to steps S12 to S13 and S19 to S20. For example, in steps S11 and S18 respectively for calculating ΔV(n) and W(n), each of the calculated values may be clipped so as to be within a predetermined range.

3. Summary

As described above, the digital camera 1 in the present embodiment is an example of an imaging apparatus, and includes an image sensor 110 as an example of an imager, a lens controller 240 as an example of a focusing driver, and a camera controller 140 as an example of a controller. In addition, the camera body 100 as an example of the imaging apparatus in the present embodiment includes an image sensor 110 as an example of an imager, and a camera controller 140 as an example of both of a focusing driver and a controller. The image sensor 110 captures a subject image formed via the interchangeable lens 200 being an example of an optical system including the focus lens 230, to generate image data. The focusing driver adjusts the focus lens position where the focus lens 230 is positioned along the optical axis in the optical system. Based on the focus lens position, the camera controller 140 performs image processing for scaling the image indicated by the image data, that is, changing the magnification of the image (S4). The focusing driver moves the focus lens position back and forth in a predetermined wobbling period Ta. The camera controller 140 controls the correction factor V(n) defining the scaling of the image (i.e., magnification change) in the image processing, to follows the change in which the focus lens position swings in a period longer than the wobbling period Ta, that is, the swing period Tb (S2, S3).

According to the above imaging apparatus, for example, when AF operation using wobbling control occurs an swing component (Tb) which is conceivable to significantly reduce the image quality, the fluctuation of the image magnification due to the swing component is corrected by the image processing of the electronic zoom (S2 to S4). Thus, it is possible to efficiently reduce degradation in image quality caused by the fluctuation in image magnification during the focusing operation.

In the present embodiment, the camera controller 140 filters oscillation of the focus lens position having a period less than or equal to the wobbling period Ta (S2), and controls the correction factor V(n) so that the correction factor follows the change in which the focus lens position swings (S3). Thus, the wobbling component or the like of the wobbling period Ta can be dared to be excluded from the electronic zoom correction target, and thus the deterioration in the image quality can be efficiently reduced.

In the present embodiment, the camera controller 140 performs the LPF processing that is the filtering of the oscillation by the control of the timing for sampling the focus lens position (see FIG. 7). Thus, a high-frequency component such as the wobbling component can be excluded the electronic zoom correction target by simple processing such as timing control.

In the present embodiment, the camera controller 140 changes the correction factor V(n) from the reference correction factor Vo being a predetermined reference value in response to the change in the focus lens position (S11 to S21). As the change in the focus lens position is more biased toward one direction of the near direction and the far direction along the optical axis, the camera controller 140 causes the magnitude |W(n)| by which the correction factor V(n) changes from the reference correction factor. Vo to be smaller (S15 to S18).

According this centering control, for the change in the focus lens position that does not swing like the swing component to be corrected, the correction factor V(n) is kept near the reference correction factor Vo, and thus a room for changing the correction factor V(n) can be secured. Therefore, when the swing component occurs, the fluctuations in the image magnification can be corrected accurately. Thus, it is possible to efficiently reduce degradation in image quality caused by the fluctuation in image magnification during the focusing operation.

In the present embodiment, the electronic zoom image processing (S4) scales the image in a state where the correction factor V(n) is the reference correction factor Vo (see FIG. 8). The camera controller 140 restricts the correction factor V(n) within the range of the predetermined width 2 Wm including the reference correction factor Vo to perform the above-described image processing (S4). With the restriction of the correction factor V(n) such situation can be avoided that the influence of image quality degradation or angle of view reduction is excessive due to a large electronic zoom, and degradation in image quality can be efficiently reduced.

In the present embodiment, the image sensor 110 performs an imaging operation in a predetermined frame period Tf (S1). When the magnitude |ΔV(n)| of the change in the focus lens position in the frame period Tf is larger than the predetermined value ΔVm (YES in S12), the camera controller 140 restricts the change in the correction factor V(n) (S13). With this clip processing, when the focusing state changes rapidly, the electronic zoom can be corrected softly, and deterioration in image quality can be easily reduced.

Other Embodiments

As described above, the first embodiment is described as an example of the technique disclosed in the present application. However, the technique in the present disclosure is not limited thereto, and can also be applied to embodiments in which changes, substitutions, additions, omissions, and the like are made as appropriate. In addition, it is also possible to combine each component described in the first embodiment to form a new embodiment. Thus, in the following, other embodiments will be exemplified.

In the first embodiment, an example of the LPF processing (S2) for removing the wobbling component is described that the sampling timing control is performed, but the LPF processing is not limited thereto. Such a modification will be described with reference to FIG. 13.

Figure 13:
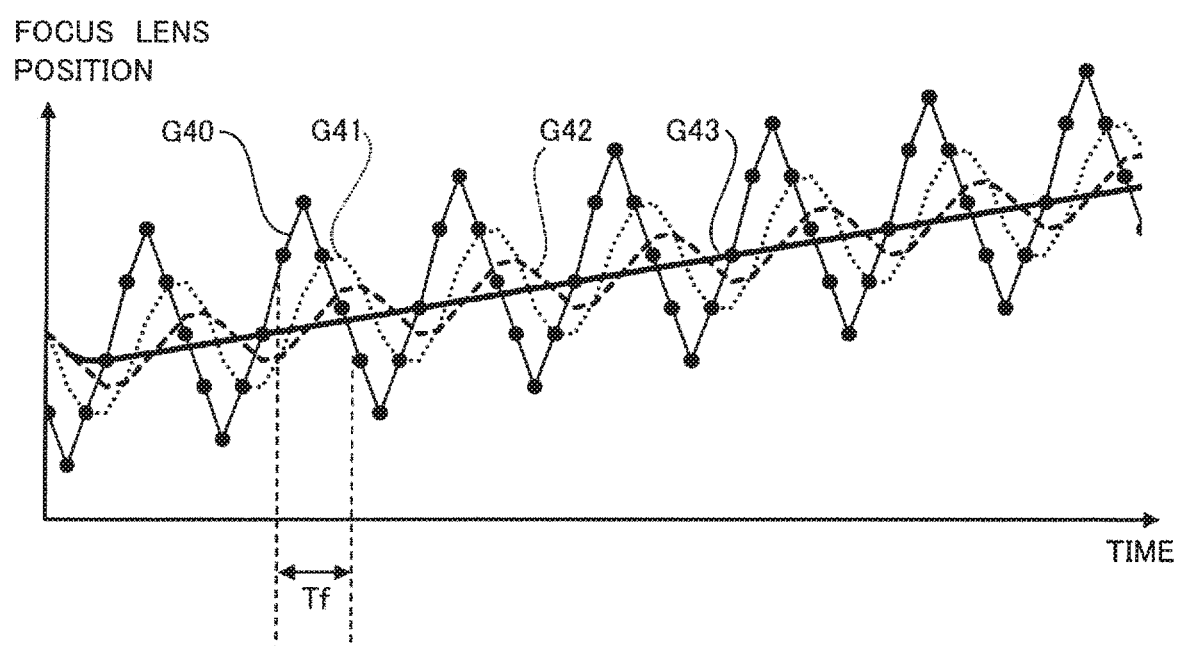
FIG. 13 is a diagram illustrating a modification of an LPF for removing wobbling component.

FIG. 13 illustrates a graph G40 of the focus lens position during the wobbling operation as in FIG. 7A. For example, the camera controller 110 may achieve the LPF process by performing calculation for averaging a plurality of adjacent focus lens positions.

FIG. 13 shows graphs G41, G42, and G43 respectively as calculation results of averaging adjacent 1, 6, and 8 points of the focus lens positions at the focus lens position of the graph G40. As shown in FIG. 13, the wobbling component can be blocked better as the number of points of focus lens positions to be averaged is more.

The number of points of focus lens positions averaged as described above is not limited to within the range of one frame period Tf, and may be over a plurality of frames. For example, when receiving information indicating a plurality of focus lens positions from the lens controller 240, the camera controller 140 stores the focus lens positions received in the most recent past frame in the RAM 141 and can use them for the averaging calculation.

Furthermore, in the first embodiment, an example is described that the focus lens position is sampled every frame period Tf, but the sampling may be performed every multiple frame periods Tf. For example, the LPF process may be realized by acquiring the focus lens position at the frame timing every wobbling period Ta (or every integer multiple thereof).

As described above, in the present embodiment, the controller of the imaging apparatus may filters the oscillation of the focus lens position, which has the period less than or equal to the wobbling period, by calculating average of the plurality of focus lens positions. With this simple processing, it is possible to easily remove the high frequency component from the correction target and efficiently reduce the deterioration in the image quality.

In each of the above-described embodiments, an operation example is described that the electronic zoom correction processing is performed by using the centering control in a case where the wobbling control is used for the AF operation. Such centering control does not necessarily have to be on the premise of wobbling control. Centering control may be applied, for example, in a situation where change in the focus lens position similar to the swing component occurs without a wobbling operation. Even in this case, the fluctuation in the image magnification due to the above change can be easily corrected, and the deterioration in the image quality due to the fluctuation in the image magnification during the focusing operation can be efficiently reduced.

In each of the embodiments described above, an operation example at the time of shooting a moving image in the digital camera 1 has been described, but the idea of the present disclosure is not necessarily limited to the time of shooting a moving image. The electronic zoom correction processing (FIG. 8) described above may be performed on image data for live view display, or may be performed on image data at the time of shooting a still image.

In each of the above embodiments, an interchangeable lens type digital camera described as an example of the imaging apparatus, but the imaging apparatus of the present embodiment may be not in particular an interchangeable lens type digital camera. The idea of the present disclosure may be applied not only to a digital camera but also to a movie camera, and can also be applied to an electronic apparatus having various imaging functions such as a mobile phone or a PC with a camera.

As described above, the embodiments are described as the exemplification of the technique in the present disclosure. To that end, the accompanying drawings and the detailed description are provided.

Therefore, among the components described in the accompanying drawings and detailed description, not only the component essential for solving the problem, but also the component not essential for solving the problem may be included in order exemplify the above technique. Therefore, it should not be certified that these non-essential components are essential immediately because these non-essential components are described in the accompanying drawings and the detailed description.

In addition, since the above embodiment is for illustrating the technique in the present disclosure, various changes, substitutions, additions, omissions, and the like can be made within the scope of the claims or the equivalent thereof.

The present disclosure can be applied to various imaging apparatuses that perform a focusing operation.

The invention claimed is:

1. An imaging apparatus comprising:
   an imager configured to capture a subject image formed via an optical system including a focus lens to generate image data;
   a focusing driver configured to adjust a focus lens position at which the focus lens is positioned along an optical axis in the optical system; and
   a controller configured to perform image processing for scaling an image indicated by the image data based on the focus lens position,
   wherein the focusing driver moves the focus lens position back and forth in a predetermined wobbling period, and
   wherein the controller controls a correction factor to follow a change in which the focus lens position swings in a period longer than the wobbling period, the correction factor defining the scaling of the image in the image processing.

2. The imaging apparatus according to claim 1, wherein the controller filters oscillation of a focus lens position with a period less than or equal to the wobbling period, and controls the correction factor to follow the change in which the focus lens position swings.

3. The imaging apparatus according to claim 2, wherein the controller filters the oscillation by at least one of controlling timing for sampling the focus lens position and calculating average of a plurality of focus lens positions.

4. The imaging apparatus according to claim 1,
   wherein the controller changes the correction factor from a predetermined reference value in response to the change in the focus lens position, and
   wherein the controller causes magnitude by which the correction factor changes from the reference value to be smaller, as the change in the focus lens position is more biased toward one direction of two directions along the optical axis.

5. The imaging apparatus according to claim 4,
   wherein the image processing scales the image in a case where the correction factor is the reference value, and
   wherein the controller restricts the correction factor within a predetermined range including the reference value to perform the image processing.

6. The imaging apparatus according to claim 4,
   wherein the imager performs an imaging operation in a predetermined frame period, and wherein the controller restricts change of the correction factor when magnitude of the change in the focus lens position within the frame period is larger than a predetermined value.

7. An imaging apparatus comprising:

an imager configured to capture, for each frame period, a subject image formed via an optical system including a focus lens to generate image data;

a focusing driver configured to adjust a focus lens position at which the focus lens is positioned along an optical axis in the optical system; and a controller configured to perform image processing for scaling an image indicated by the image data for each frame period based on the focus lens position, wherein the controller changes a correction factor by a change amount with respect to a predetermined reference value by calculating a difference in image magnification among successive frames based on a change in the focus lens position per frame period, the correction factor defining the scaling of the image in the image processing, and wherein the controller causes magnitude of the change amount with respect to the reference value in the correction factor to be smaller, as the change in the focus lens position is more biased toward one direction of two directions along the optical axis.

8. An imaging apparatus comprising:

an imager configured to capture, for each frame period, a subject image formed via an optical system including a focus lens to generate image data;

a focusing driver configured to adjust a focus lens position at which the focus lens is positioned along an optical axis in the optical system; and a controller configured to perform image processing for scaling an image indicated by the image data for each frame period based on the focus lens position, wherein the controller changes a correction factor by a change amount with respect to a predetermined reference value according to change in the focus lens position per frame period, the correction factor defining the scaling of the image in the image processing, and wherein the controller causes the magnitude of the change amount in the correction factor to be smaller, as cumulative change in the focus lens position over multiple frame periods is more biased toward the one direction of the two directions along the optical axis.

* * * * *